(12) United States Patent
Harned et al.

(10) Patent No.: US 6,919,654 B2
(45) Date of Patent: Jul. 19, 2005

(54) LINEAR MOTOR WITH MAGNET RAIL SUPPORT, END EFFECT COGGING REDUCTION, AND SEGMENTED ARMATURE

(75) Inventors: Timothy J. Harned, N. Hampton, NH (US); Steven Roger Huard, Rohnert Park, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/938,978

(22) Filed: Sep. 10, 2004

(65) Prior Publication Data

US 2005/0029877 A1 Feb. 10, 2005

Related U.S. Application Data

(62) Division of application No. 10/357,880, filed on Feb. 4, 2003.
(60) Provisional application No. 60/358,498, filed on Feb. 19, 2002.

(51) Int. Cl.⁷ .............................................. H02K 41/00
(52) U.S. Cl. ........................................... 310/12; 310/13
(58) Field of Search ..................................... 310/12–13

(56) References Cited

U.S. PATENT DOCUMENTS

| | | |
|---|---|---|
| 2,092,058 A | 9/1937 | Ferris |
| 2,169,100 A | 8/1939 | Lange |
| 2,694,650 A | 11/1954 | Herman et al. |
| 2,780,742 A | 2/1957 | Jenner et al. |
| 3,575,650 A | 4/1971 | Fengler |
| 3,829,746 A | 8/1974 | Van et al. |
| 3,867,676 A | 2/1975 | Chai et al. |
| 4,151,447 A | 4/1979 | von der Heide et al. |
| 4,220,899 A | 9/1980 | von der Heide |
| 4,260,926 A | 4/1981 | Jarret et al. |
| 4,318,038 A | 3/1982 | Munehiro |
| 4,369,383 A | 1/1983 | Langley |

(Continued)

FOREIGN PATENT DOCUMENTS

| | | |
|---|---|---|
| DE | 3226243 | 1/1984 |
| DE | 3540349 | 11/1985 |
| FR | 2 678 448 | 6/1992 |
| JP | 58-54863 | 3/1983 |
| JP | 62-25861 | 2/1987 |
| JP | 62-193543 | 8/1987 |
| JP | 2002-227651 | 8/1990 |
| JP | 4-21349 | 1/1992 |
| JP | 4-109857 | 4/1992 |
| WO | 90/09698 | 8/1990 |

OTHER PUBLICATIONS

Communication Relating to the Results of the Partial International Search regarding International Application No. PCT/US03/03276.

*Primary Examiner*—Thanh Lam
(74) *Attorney, Agent, or Firm*—Renner, Otto, Boisselle & Sklar, LLP

(57) ABSTRACT

A linear motor is provided which includes members for engaging a magnet rail to prevent bending of the magnet rail. Such members may include a wheel or sliding block, for example. The members exert a force proximate an upper edge of the magnet rail to counter potential bending of the magnet rail during operation of the motor, and thereby avoid substantial variations in the air gaps. Furthermore, an armature yoke is provided which includes at least one partial tooth at one end of the armature yoke for reducing an end effect cogging of the linear motor armature in relation to a magnet rail along which the armature will run. In addition, an armature yoke is provided which includes multiple segments which are held end-to-end via fasteners. Such fasteners may serve as part of the magnetic flux path. A support strip may be provided to reduce bowing.

7 Claims, 7 Drawing Sheets

U.S. PATENT DOCUMENTS

| | | | |
|---|---|---|---|
| 4,408,138 A | 10/1983 | Okamoto | |
| 4,408,145 A | 10/1983 | Artemenko et al. | |
| 4,424,463 A | 1/1984 | Musil | |
| 4,427,740 A | 1/1984 | Stackhouse et al. | |
| 4,460,855 A | 7/1984 | Kelly | |
| 4,496,923 A | 1/1985 | Lenzing | |
| 4,508,984 A | 4/1985 | Guedj et al. | |
| 4,542,312 A | 9/1985 | Kawamura | |
| 4,554,491 A | 11/1985 | Plunkett | |
| 4,560,911 A | 12/1985 | Chitayat | |
| 4,595,870 A | 6/1986 | Chitayat | |
| 4,603,270 A | 7/1986 | Van Davelaar | |
| 4,625,132 A | 11/1986 | Chitayat | |
| 4,631,430 A | 12/1986 | Aubrecht | |
| 4,631,431 A | 12/1986 | Viskochil | |
| 4,633,108 A | 12/1986 | von der Heide | |
| 4,636,667 A | 1/1987 | Holzinger et al. | |
| 4,638,192 A | 1/1987 | von der Heide | |
| 4,641,065 A | 2/1987 | Shibuki et al. | |
| 4,644,199 A | 2/1987 | Langley | |
| 4,705,971 A | 11/1987 | Nagasaka | |
| 4,725,750 A | 2/1988 | Welch | |
| 4,749,921 A | 6/1988 | Chitayat | |
| 4,758,750 A | 7/1988 | Itagaki et al. | |
| 4,782,316 A | 11/1988 | Domeki et al. | |
| 4,839,543 A | 6/1989 | Beakley et al. | |
| 4,862,024 A | 8/1989 | Stingle et al. | |
| 4,868,431 A | 9/1989 | Karita et al. | |
| 4,912,746 A | 3/1990 | Oishi | |
| 4,922,165 A | 5/1990 | Crawford et al. | |
| 4,937,485 A | 6/1990 | Mihalko | |
| 4,945,268 A | 7/1990 | Nihei et al. | |
| 5,013,223 A * | 5/1991 | Takahashi et al. | 417/413.1 |
| 5,087,844 A | 2/1992 | Takedomi et al. | |
| 5,093,543 A | 3/1992 | Patton et al. | |
| 5,138,208 A | 8/1992 | Kondo et al. | |
| 5,198,711 A * | 3/1993 | Eckersley | 310/12 |
| RE34,674 E | 7/1994 | Beakley et al. | |
| 5,642,013 A | 6/1997 | Wavre | |
| 5,744,879 A | 4/1998 | Stoiber | |
| 5,910,691 A | 6/1999 | Wavre | |
| 6,038,192 A | 3/2000 | Clinton et al. | |
| 6,407,471 B1 | 6/2002 | Miyamoto et al. | |

\* cited by examiner

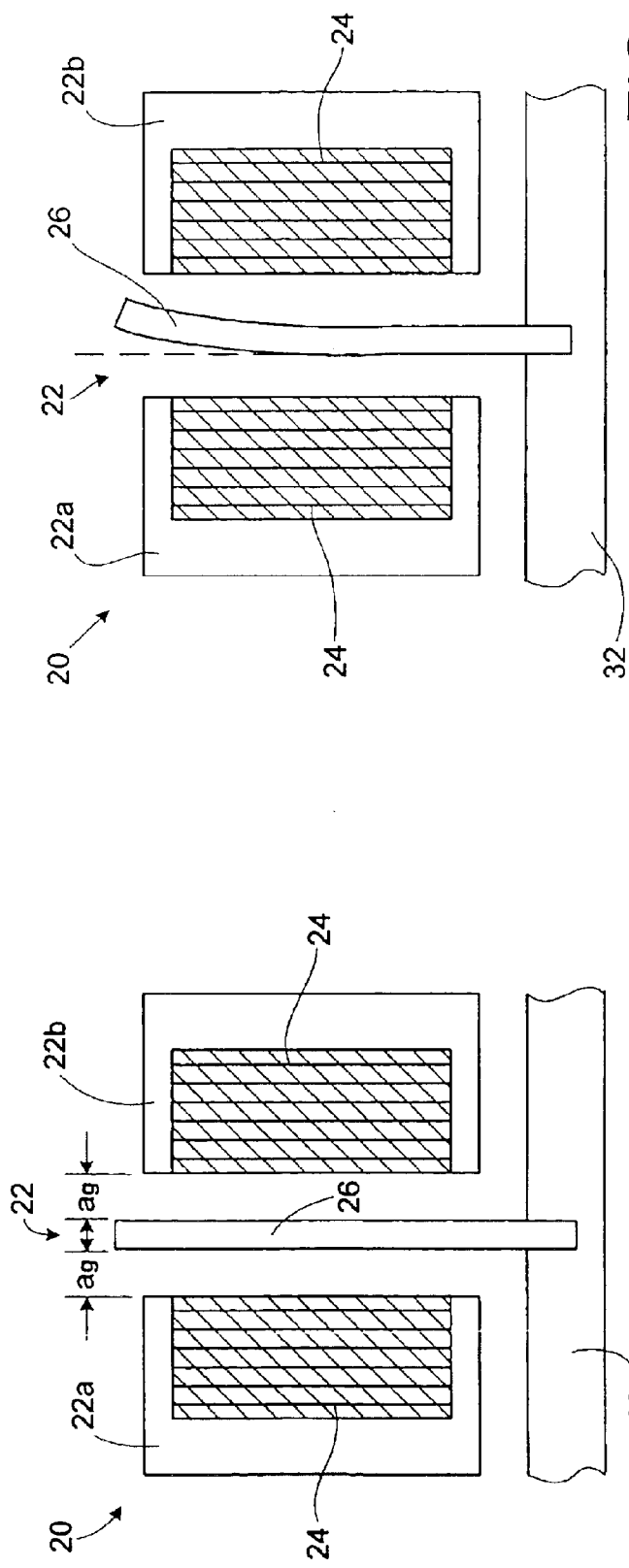
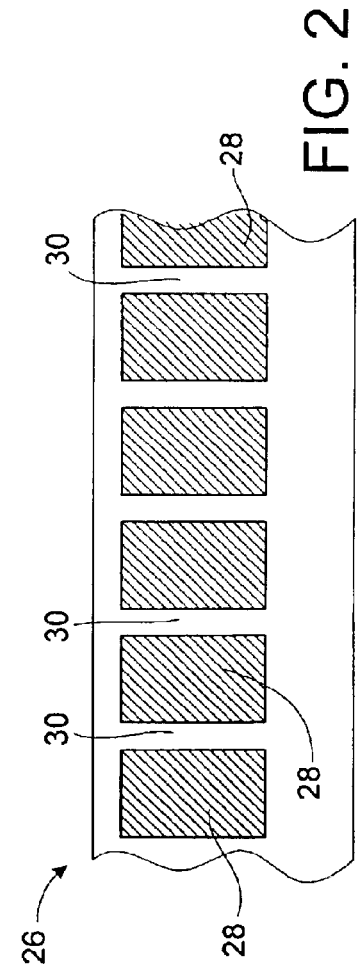

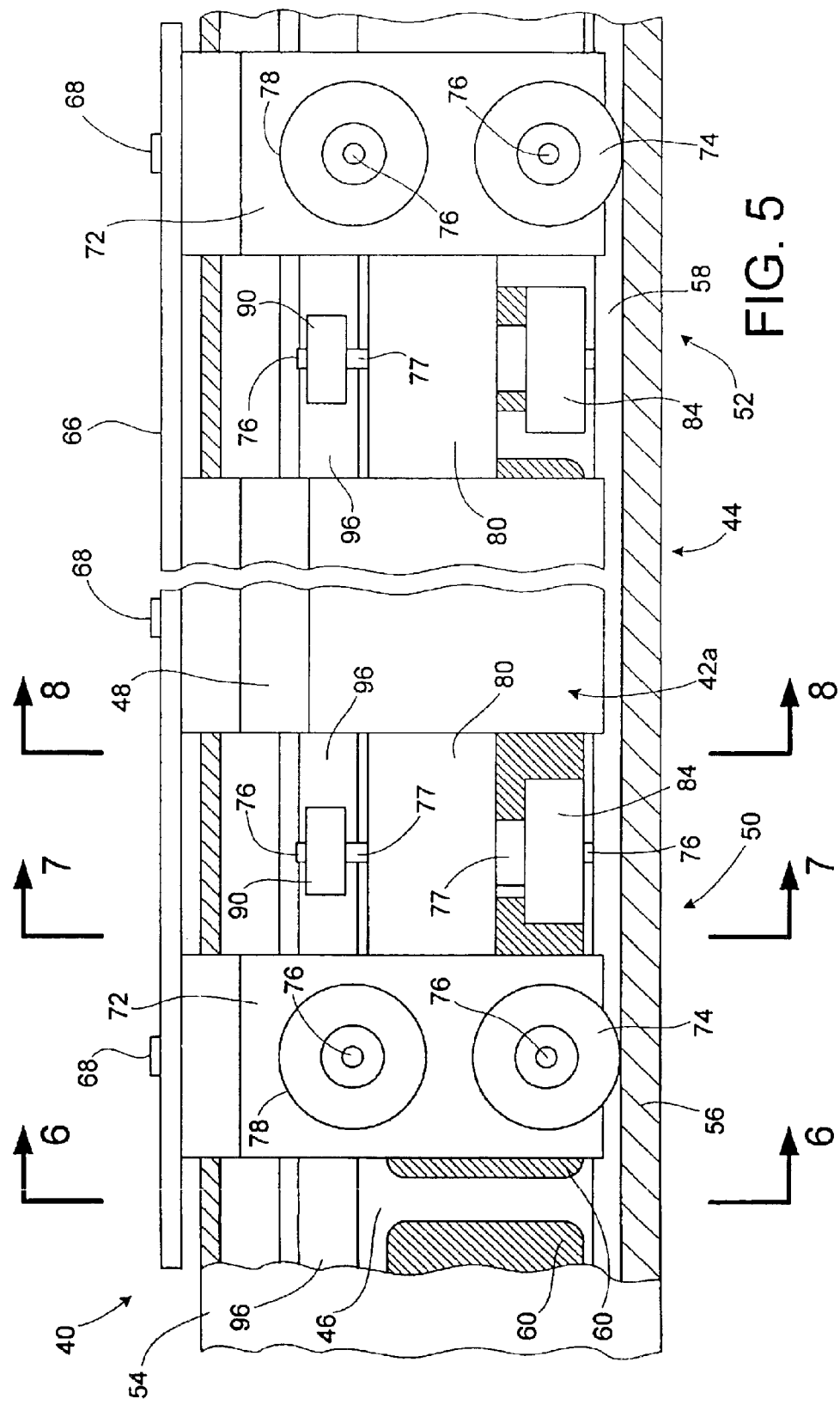

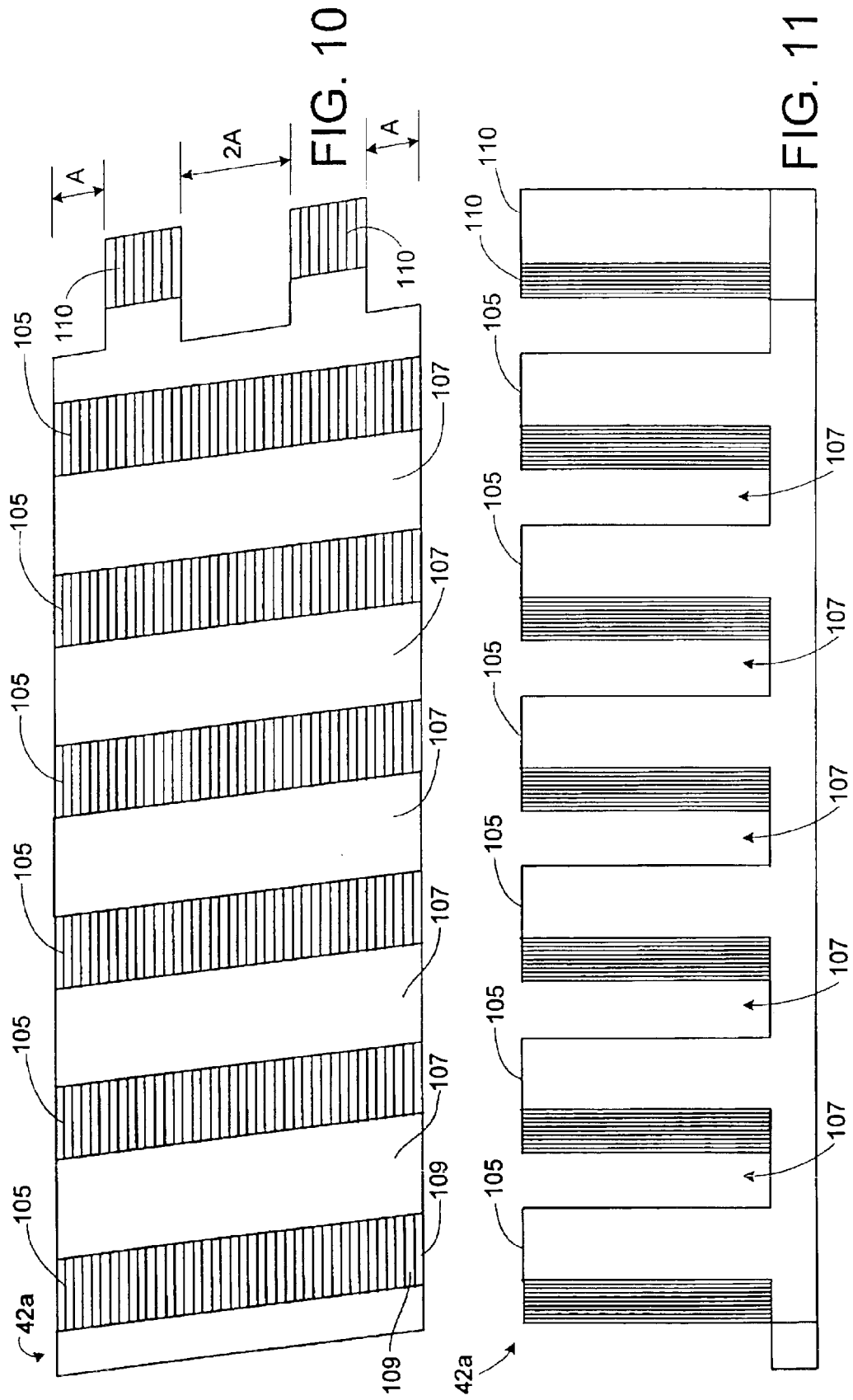

LINEAR MOTOR WITH MAGNET RAIL SUPPORT, END EFFECT COGGING REDUCTION, AND SEGMENTED ARMATURE

This application is a divisional of U.S. patent application Ser. No. 10/357,880 filed on Feb. 4, 2003, which claims priority to U.S. Patent Application No. 60/358,498 filed on Feb. 19, 2002, which is hereby incorporated herein by reference in its entirety.

TECHNICAL FIELD

The present invention relates generally to linear motors, and more particularly to a linear motor which offers improved performance and manufacturabilty.

BACKGROUND OF THE INVENTION

Linear motors are known in the art. According to a typical configuration, the linear motor includes an armature which makes up the stator. The armature includes a yoke made up of a pack of ferromagnetic laminations. The yoke includes a plurality of teeth arranged at a predefined pitch, with a plurality of slots respectively separating the teeth. The armature further includes coil windings wound around the teeth and housed in the respective slots.

The linear motor also includes a magnet rail which forms the rotor. The magnet rail includes a plurality of plate-like permanent magnets. The magnets are positioned linearly along the rail at a predefined pitch with corresponding gaps therebetween. The armature travels along the length of the magnet rail with the teeth of the armature adjacent the magnets. The position of the armature is determined via a sensor, and a controller controls the current provided to the coil windings based on the armature position. In this manner, the armature may be selectively driven back and forth along the magnet rail. See, e.g., U.S. Pat. No. 5,642,013.

One particular type of linear motor is known as a double-sided linear motor. In a double-sided linear motor, the armature includes a pair of yokes symmetrically disposed on opposite sides of the magnet rail. Each yoke includes its own set of coil windings. The windings of both yokes are driven so as to increase the amount of force available from the linear motor as compared to a more conventional single yoke armature. See, e.g., U.S. Pat. No. 4,868,431.

Linear motors such as those described above are quite useful in a variety of applications. These applications include, but are not limited to, control systems, manufacturing processes, robotics, etc. Linear motors provide precision linear movement in a whole host of applications.

Despite the recognized advantages associated with known linear motors, there have been a number of drawbacks. For example, it is desirable that the double-sided linear motor maintain an air gap of approximately equal dimension between the yoke and the magnet rail on each side of the magnet rail. Failure to provide such equal airgap results in uneven magnetic forces being exerted on the magnet rail. In the case of a relatively thin magnet rail, this can result in a bending of the rail which further exacerbates uneveness in the air gap and the magnetic forces exerted on the magnet rail by the respective yokes.

Still another drawback associated with linear motors is "cogging". Linear motors have a cogging or detent force that is created by the interaction between the permanent magnets on the magnet rail and the magnetic iron forming the teeth of the armature yoke. Such cogging occurs even when the windings are not energized. Cogging typically occurs at a frequency that is determined by the number of slots per North-South permanent magnet cycle on the magnet rail. There typically are several cycles of this cogging in one North or South magnet pole cycle.

In addition, because the armature in linear motors is not infinitely long it has magnetic ends (in the direction of travel). The magnetic field at the ends of the armature is different from the magnetic field at the interior of the armature. This difference in magnetic fields causes a second cogging or detent force, referred to herein a "end effect cogging". End effect cogging does not exist in a rotary motor because rotary motors do not have a magnetic end as will be appreciated.

In general, cogging forces introduce disturbance forces into the operation of linear motors. There have been several approaches in the past for reducing such cogging forces. See, e.g., U.S. Pat. Nos. 4,638,192, 4,912,746, 5,744,879 and 5,910,691. However, these approaches have met with only varying degrees of success. Moreover, these approaches oftentimes require significant modifications to both ends of the armature which leads to undesirable complexity, increased manufacturing costs, etc.

Yet another drawback with conventional linear motors is complexity associated with manufacture. The size and length of the armature, for example, is dependent upon the particular application of the motor, the desired force, etc. From the point of view of the manufacturer, this can result in the frequent need to custom manufacture an armature. Alternatively, the manufacturer may need to keep in stock a variety of different size and length armatures.

In view of the aforementioned drawbacks associated with conventional linear motors, it will be appreciated that there is a strong need in the art for a linear motor and method for designing the same which overcomes such drawbacks. More particularly, there is a strong need in the art for a double-sided linear motor which is less susceptible to uneven air gaps and/or bending of the magnet rail. Moreover, there is a strong need in the art for a linear motor that is less susceptible to the detrimental effects of cogging, and particularly those of end-cogging. Furthermore, there is a strong need in the art for a linear motor that is readily and efficiently manufacturable in different lengths without requiring complete custom design.

SUMMARY OF THE INVENTION

According to one aspect of the invention, a double-sided linear motor is provided. The double-sided linear motor includes a magnet rail comprising a plurality of permanent magnets arranged along a length of the magnet rail, a lower edge of the magnet rail being secured to a base; an armature comprising a first armature yoke and a second armature yoke each including a plurality of teeth separated by slots, and coil windings within the slots which are energized during operation of the motor; a motor support carriage for supporting the first armature yoke and the second armature yoke on respective sides of the magnet rail with a predefined air gap between the teeth of the first and second armature yokes and the respective sides of the magnet rail, and permitting the armature to move along the length of the magnet rail during operation of the motor; and at least one engaging member mounted to the motor support carriage for exerting a force proximate an upper edge of the magnet rail to counter potential bending of the magnet rail during operation of the motor and thereby avoid substantial variations in at least one of the air gaps.

According to another aspect of the invention, a linear motor armature is provided. The linear motor armature includes an armature yoke including N teeth separated by slots, where N is an integer, and coil windings within the slots which are energized during operation of the motor; and wherein the armature yoke further includes at least one partial tooth at one end of the armature yoke for reducing an end effect cogging of the linear motor armature in relation to a magnet rail along which the armature will run, and does not include any partial teeth at the other end of the armature yoke.

In accordance with yet another aspect of the invention, a linear motor armature yoke is provided. The linear motor armature yoke includes a plurality of discrete yoke segments each including a plurality of teeth and a plurality of slots in which coil windings will be wound; and fasteners which hold the yoke segments together end-to-end within the armature yoke.

According to another aspect of the invention, a linear armature yoke is provided which includes a relatively long yoke having a front face comprising a plurality of slots for receiving armature windings, a rear face and two side faces; and at least one thin support strip secured to one of the side faces to reduce bowing along the length of the yoke.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a schematic cross section of an "ideal" double-sided linear motor;

FIG. 2 is a schematic side view of a magnetic rail included in the double-side linear motor of FIG. 1;

FIG. 3 is a schematic cross section of the double-sided linear motor of FIG. 1 experiencing a bending of the magnet rail;

FIG. 5 is a side view in partial cutaway of the linear motor of FIG. 4 shown in accordance with the present invention;

FIG. 10 is a top view of an armature yoke for a linear motor with reduced end effect cogging in accordance with the present invention;

FIG. 11 is a front view of the armature yoke of FIG. 9;

DETAILED DESCRIPTION OF THE INVENTION

Figure 4:
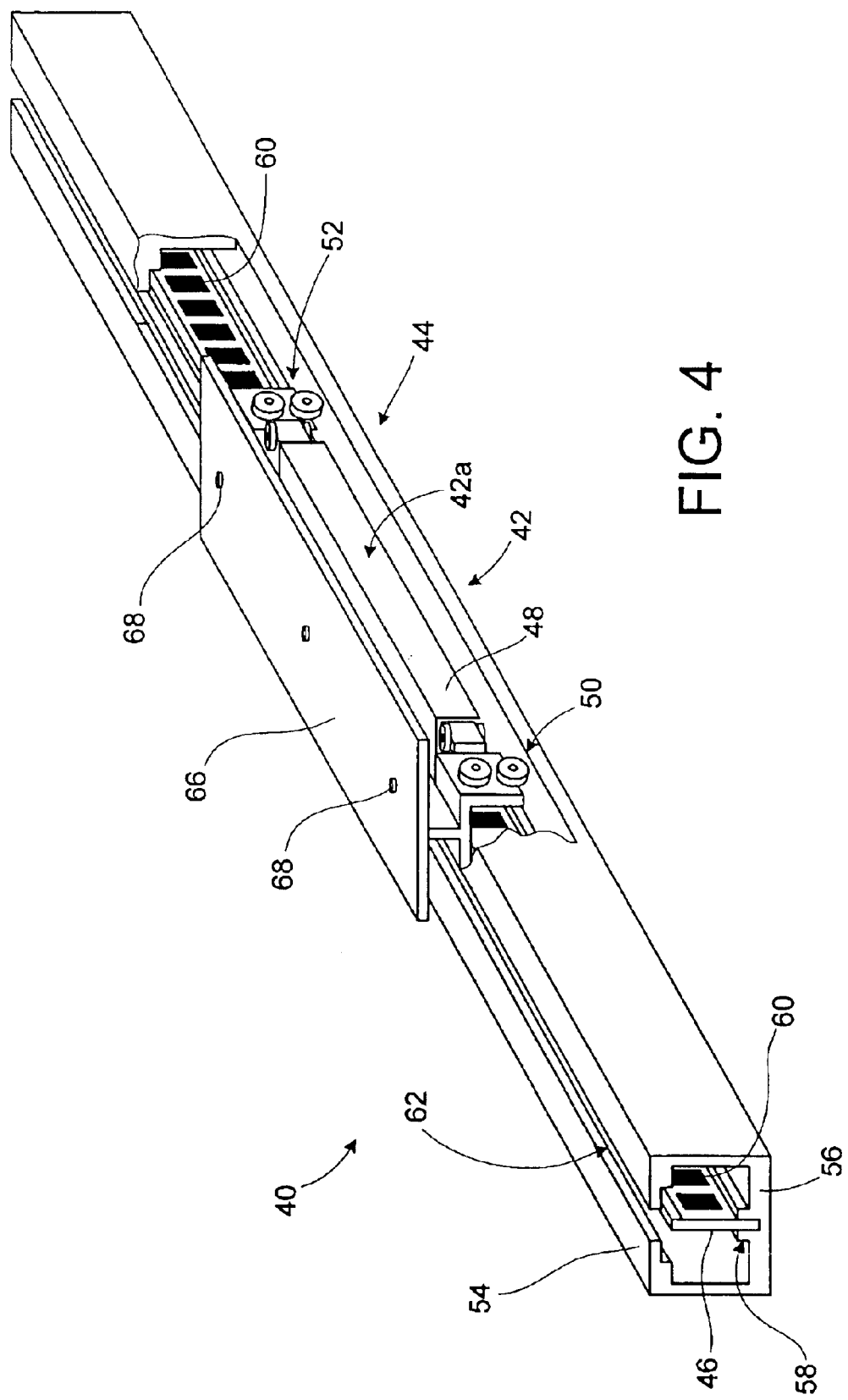
FIG. 4 is a perspective view, shown in partial cutaway, of a double-sided linear motor in accordance with the present invention.

The present invention will now be described with reference to the drawings, wherein like reference numerals are used to refer to like elements throughout.

Referring initially to FIG. 1, a cross-section of a double-sided linear motor 20 is shown schematically. The motor 20 includes an armature 22 made up of armature yokes 22a and 22b. Each armature yoke 22a, 22b includes a set of coil windings 24 wound between teeth of the respective yokes. The armature yokes 22a, 22b are positioned on opposite sides of a magnet rail 26 by a motor support carriage (not shown). Ideally, the teeth of the armature yokes 22a, 22b are separated from the magnet rail 26 by a predetermined air gap "ag" on each side.

FIG. 2 is a side view of the magnet rail 26. As shown, the magnet rail 26 includes a plurality of plate-like permanent magnets 28. The magnets 28 are positioned linearly along the rail 26 at a predefined pitch with corresponding gaps 30 therebetween. The magnet rail 26 may be made of molded or machined plastic, fiberglass, metal or the like, with the permanent magnets 28 molded, glued, or otherwise retained therein. The magnet rail 26 is supported by virtue of its lower edge being held is a base member 32. The upper edge of the rail 26 is generally unsupported.

During operation, the armature 22 travels along the length of the magnet rail 26 with the teeth of the armature yokes 22a, 22b adjacent the magnets 28. As is known, current is applied to the coil windings within the armature 22 based on the relative position of the armature teeth to the permanent magnets 28. A traveling magnetic wave is created which propels the armature 22 along the length of the magnet rail 26.

As previously mentioned, it is desirable that the double-sided linear motor 20 maintain the air gap ag of approximately equal dimension between the yoke 22a, 22b and the magnet rail 26 on each side of the magnet rail 26. Failure to provide such approximately equal air gap ag can result in uneven magnetic forces being exerted on the magnet rail 26. In the case of a relatively thin magnet rail 26, this can result in a bending of the rail 26 as is shown in FIG. 3. Such bending of the rail 26 further exacerbates any unevenness in the air gaps and the magnetic forces exerted on the magnet rail 26 by the respective yokes 22a, 22b.

Furthermore, simple wear and tear on the motor 20 can cause the magnet rail 26 to weaken structurally and thus result in such bending of the rail. In either event, the unevenness in the air gaps is further exacerbated by the resultant uneven magnetic forces. This can lead to problems with motor efficiency, restricted movement of the armature, etc.

The linear motor of the present invention avoids such problems associated with bending of the magnet rail. More specifically, the linear motor of the present invention provides a mechanism by which the upper edge of the magnet rail is supported. As a result, the air gaps between the armature yokes and the magnet rail are maintained. Thus, the motor can operate with better efficiency, increased lifespan, etc.

Referring now to FIG. 4, a double-sided linear motor 40 is shown in accordance with one embodiment of the present invention. Although only one side of the motor 40 is shown in FIG. 4, it will be appreciated that the opposite side is generally a mirror image. The motor 40 includes an armature 42 made up of a first armature yoke 42a and a second armature yoke 42b (not shown in FIG. 4) which is generally a mirror image of the first armature yoke 42a. As is conventional, each armature yoke 42a, 42b includes a plurality of teeth arranged side-by-side with slots therebetween.

In addition, each armature yoke 42a, 42b includes coil windings within the slots which are energized during operation of the motor 40.

The motor 40 further includes a motor support carriage 44 for supporting the armature yokes 42a, 42b on respective sides of a magnet rail 46 with a predefined air gap between the teeth of the armature yokes 42a, 42b and the respective sides of the magnet rail 46. The motor support carriage 44 includes a motor support yoke 48 which supports the armature yokes 42a, 42b. In addition, the motor support carriage 44 includes a support car 50 at one end of the armature 42 for supporting one end of the motor support yoke 48, and a support car 52 at the other end of the armature 42 for supporting the other end of the motor support yoke 48.

As will be described in more detail below in relation to FIGS. 5–8, the support cars 50, 52 each include a set of wheels, e.g., six or virtually any other number of wheels, which facilitate movement of the armature 42 along the length of the magnet rail 46. More specifically, the magnet rail 46 is housed within a housing 54. Along the center of a base 56 of the housing 54, a slot 58 is provided. The lower edge of the magnet rail 46 is inserted into the slot 58 and secured, and thus is supported at its lower edge by the base 56. The housing 54 may be made out of an extruded, non-ferromagnetic material such as aluminum, plastic, etc. The magnet rail 46 is preferably molded or machined out of plastic, fiberglass, metal, or the like, and includes permanent magnets 60 spaced along the length of the magnet rail 46 as is conventional in linear motors. In the present example, there is only a single row of magnets 60 along the length of the magnet rail 46. Thus, the same magnet 60 serves as a magnet to the armatures 42a, 42b on both sides of the magnet rail 46. In another embodiment, however, the magnet rail 46 may include two rows of magnets 60 (i.e., one on each side of the magnet rail 46). In the case of a single row of magnets 60, though, the present invention has particular utility in the sense that the magnet rail 46 is typically thinner and has less structural rigidity. Thus, the present invention's ability to avoid bending of the magnet rail 46 is particularly beneficial.

The aforementioned wheels of the support cars 50, 52 are designed to ride along channels on the inner walls of the housing 54. In this manner, the armature 42 is permitted to move freely in either direction directly along the length of the magnet rail 46. The top of the housing 54 includes a slot 62 which runs parallel with the magnet rail 46 and through which an arm of the motor support carriage 44 extends. A mounting plate 66 is secured to the motor support carriage 44 via a set of bolts 68 or the like. During operation, current is provided to the coil windings of the armature yokes 42a, 42b in conventional fashion. This causes a traveling magnetic wave to be established between the armature 42 and the magnet rail 46, thus propelling the armature 42 together with the motor support carriage 44 along the magnet rail 46. The particular direction of travel will of course depend on the phasing of the current, etc. A physical load (not shown) coupled to the mounting plate 66 can thereby be moved in a linear direction along the length of the rail 46.

Figure 8:
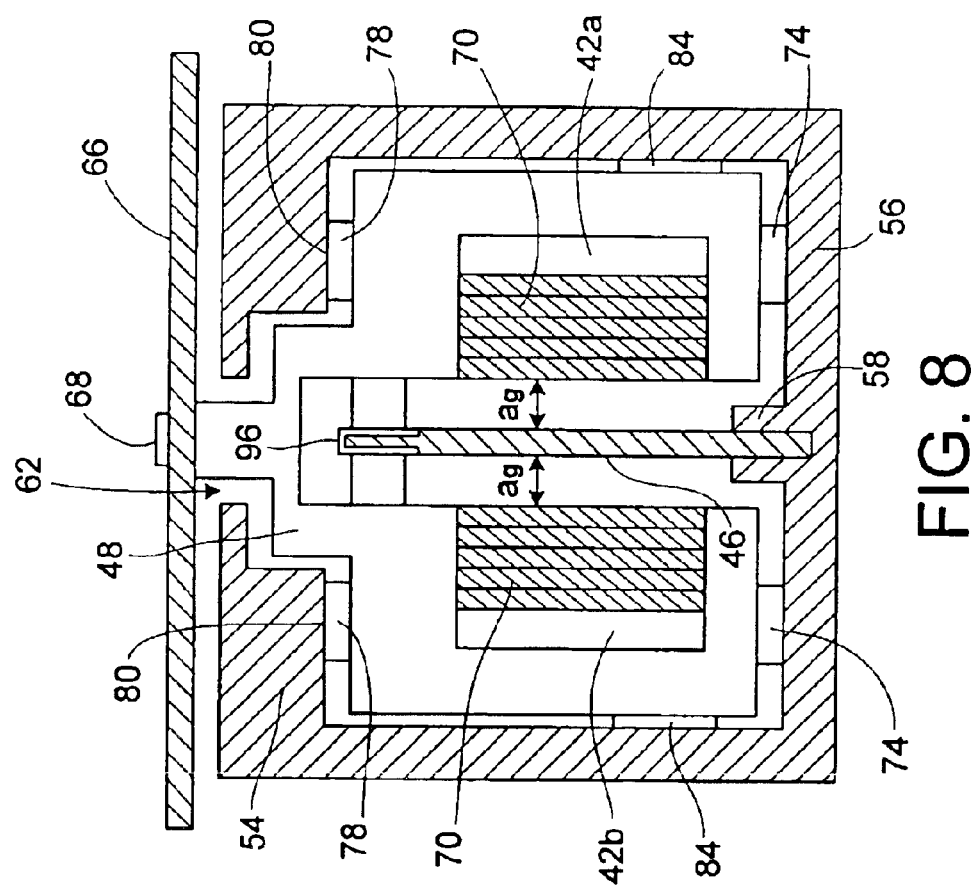
FIG. 8 is a cross-sectional view of the linear motor of FIG. 5 as taken along line 8—8.

FIG. 5 provides a side view of the linear motor 40. Again, it will be appreciated that the linear motor 40 on the opposite side of the magnet rail 46 is basically a mirror image. As is best shown in FIG. 8, the motor support carriage 44 includes a Y-shaped motor support yoke 48 which supports the armature yokes 42a, 42b. The motor support yoke 48 straddles the magnet rail 46 such that the teeth and coil windings 70 of the armature yokes 42a, 42b are a distance ag corresponding to the desired air gap away from the sides of the magnet rail 46.

Figure 6:
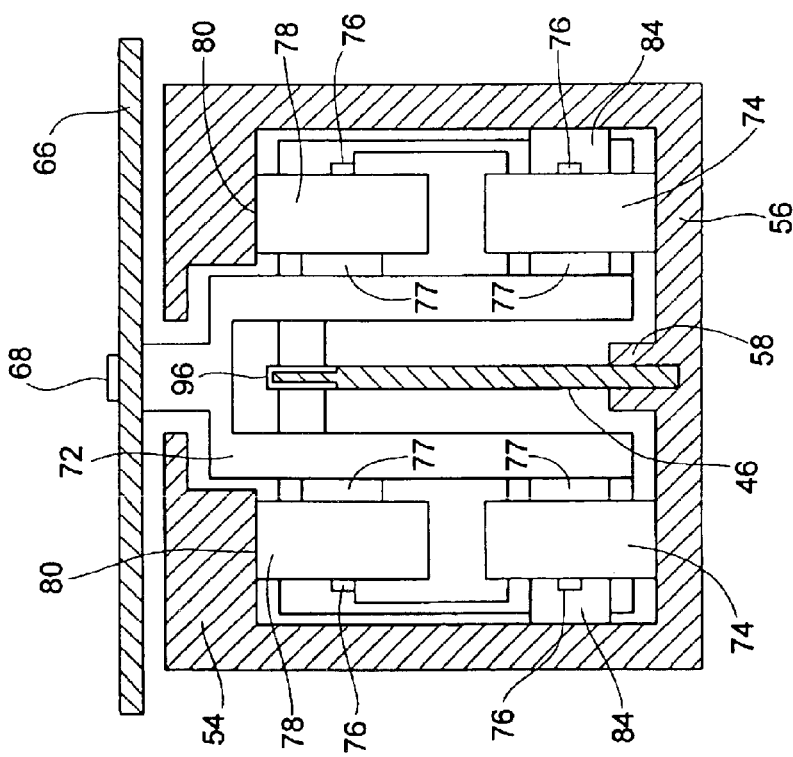
FIG. 6 is a cross-sectional view of the linear motor of FIG. 5 as taken along line 6—6.

The motor support cars 50, 52 each include a Y-shaped support car yoke 72. As is best shown in FIG. 6, the support car yoke 72 also straddles the magnet rail 46. The support car yoke 72 includes a lower wheel 74 rotatably mounted (e.g., via an axle 76 and bearings 77) on each of the sides of the yoke 72. The lower wheels 74 are designed to travel along a respective channel on the inside surface of the base 56 of the housing 54. In addition, the support car yoke 72 also includes an upper wheel 78 rotatably mounted on each of the sides of the yoke 72. The upper wheels 78 are designed to travel along a respective channel on an upper interior surface 80 of the housing 54. The spacing between the lower wheels 74 and the upper wheels 78 on each yoke 72 is designed such that vertical movement of the yoke 72 is precluded, while the wheels 74, 78 provide smooth movement in a direction along the length of the magnet rail 46.

The motor support cars 50, 52 each further includes a horizontal support strut 80 on each side of the magnet rail 46 which couples the support car yoke 72 to the respective end of the motor support yoke 48. Thus, the motor support yoke 48 is supported by and carried along the length of the magnet rail 46 via the support cars 50, 52 and their wheels 74, 78. The support cars 50, 52 along with the motor support yoke 48 may be made of any suitable material such as machined aluminum, etc.

Figure 7:
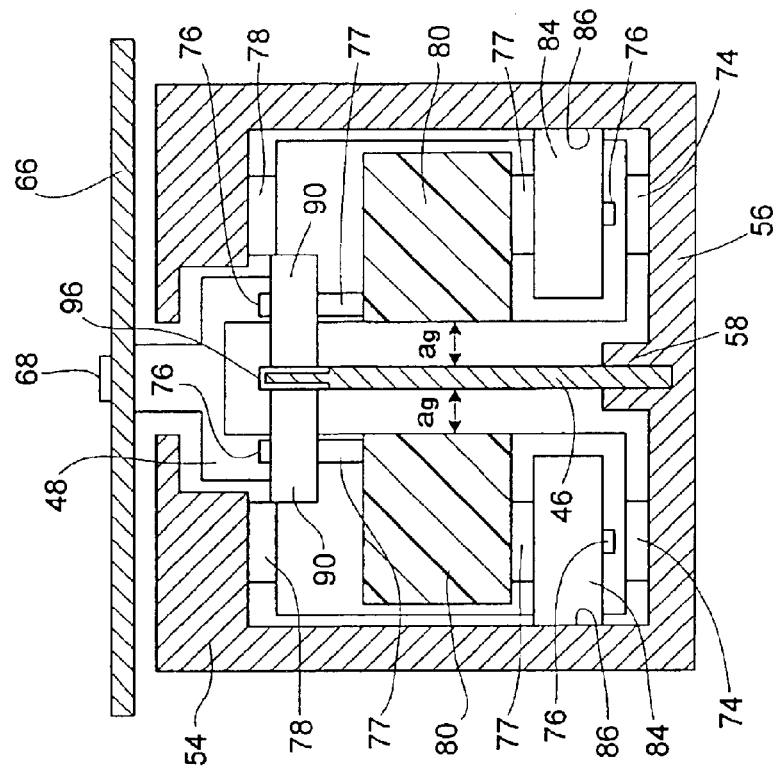
FIG. 7 is a cross-sectional view of the linear motor of FIG. 5 as taken along line 7—7.

Referring now to FIG. 7, it is shown that the bottom surface of the struts 80 of each of the support cars 50, 52 includes a laterally disposed wheel 84. The wheels 84 are each rotatably mounted to the strut 80 via an axle 76 and bearings 77, or the like. The wheels 84 are designed to travel along a respective channel on an inner side surface 86 of the housing 54. The spacing between the wheels 84 is selected so as to prevent lateral movement of the motor support cars 50, 52 (i.e., movement in a direction perpendicular to the length of the magnet rail 46. At the same time, the wheels 84 permit the support cars 50, 52 as well as the armature 42 as a whole to move freely through the housing 54 along the length of the magnet rail 46.

Continuing to refer to FIG. 7, the top surface of the struts 80 of each of the support cars 50, 52 includes a rail support wheel 90. As is best shown in FIGS. 5 and 7, the rail support wheels 90 are rotatably mounted to the struts 80 via an axle 76 and bearings 77, or the like. The rail support wheels 90 of each of the support cars 50, 52 are positioned so as to engage or lightly "pinch" opposite sides of the magnet rail 46 near the upper edge of the magnet rail 46. As is shown in FIG. 7, the upper edge of the magnet rail 46 may include a cap 96 made of aluminum or the like. The rail support wheels 90 roll freely along the cap 96 as the motor support carriage 44 moves along the length of the magnet rail 46 during operation.

As is shown in FIG. 7, the rail support wheels 90 each engage opposite sides of the magnet rail 46. The spacing between the rail support wheels 90 is approximately the same as the width of the magnet rail along the cap 96. The diameter of the wheels 90 is selected so as to provide the desired air gap ag between the magnet rail 46 and the armature yokes 42a, 42b. In this manner, the rail support wheels 90 can roll freely along the cap 96. At the same time, if the magnet rail 46 was to attempt to bend as otherwise discussed above in relation to FIG. 3, the rail support wheel 90 towards which the magnet rail 46 attempted to bend would exert a force on the side of the magnet rail 46 to prevent such bending. Therefore, the air gap ag between the magnet rail 46 and the armature yokes 42a, 42b on each side of the magnet rail 46 may be reliably maintained.

Thus, regardless of whether the magnet rail 46 may otherwise attempt to bend due to uneven magnetic forces from the armature 42 and/or fatigue of the magnetic rail 46, the rail support wheels 90 support the upper edge of the magnet rail 46 to prevent such bending. The rail support wheels 90 may be made out of aluminum, nylon, rubber, steel, or other material as will be appreciated. Moreover, it will be appreciated that although a cap 96 is provided in the exemplary embodiment, it is not necessary to include such cap 96. The rail support wheels 90 may ride directly on the main surface of the magnet rail 46.

Figure 9:
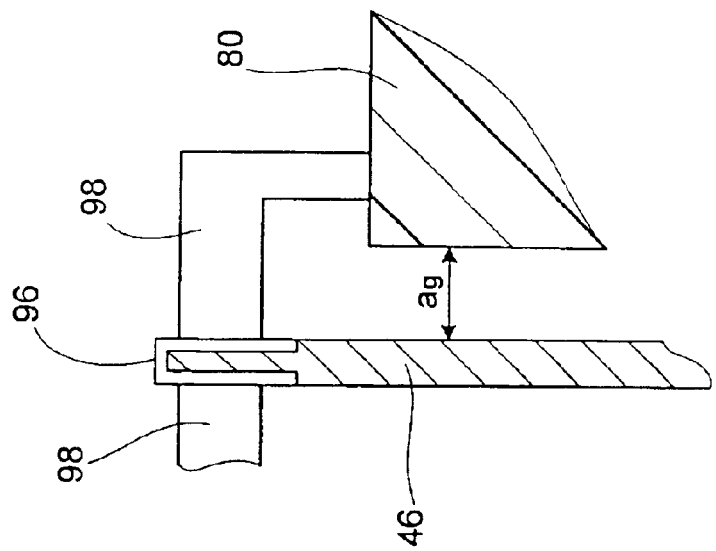
FIG. 9 is a cross-sectional view in relevant portion of an alternate embodiment of the linear motor in accordance with the present invention.

While the rail support wheels 90 are preferred due to the minimum opposition they present to movement of the armature 42, other types of engaging members are contemplated as being within the scope of the invention. For example, FIG. 9 illustrates an embodiment in which the rail support wheels 90 are replaced by slider blocks 98. The slider blocks 98 abut against respective sides of the magnet rail 46 and slide along the magnet rail 46 with travel of the armature 42. The slider blocks 98 and cap 96 may be made of nylon or some other low friction material. In addition, or in the alternative, lubricant may be provided along the cap 96 to reduce friction. In any event, the slider blocks 98 will also provide support to the magnet rail 46 so as to resist any bending of the magnet rail 46.

Figure 12:
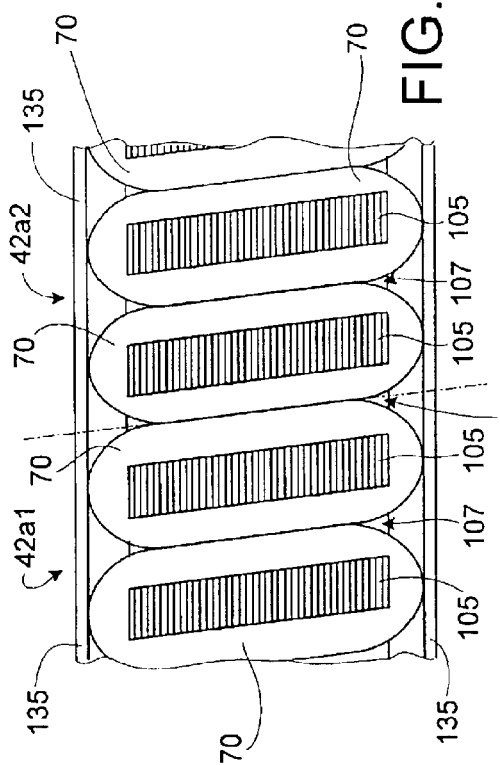
FIG. 12 is an end view of the armature yoke of FIG. 9.

Referring now to FIGS. 10–12, an exemplary armature yoke 42a is shown in accordance with the present invention. The armature yoke 42a is designed to provide reduced end effect cogging. The armature yoke 42a may make up one of the armature yokes 42a, 42b in the double-sided linear motor 40 of FIGS. 4–9. The remaining armature yoke 42b is symmetrically generally identical (e.g., generally a mirror image) with respect to the magnet rail 46. However, it will also be appreciated that the armature yoke 42a with reduced end effect cogging has equal utility in an otherwise conventional one-sided linear motor. The present invention contemplates all such arrangements.

The armature yoke 42a in the illustrated example includes N teeth 105 (where N is an integer such as N=6) separated by slots 107. The teeth 105 and slots 107 are skewed at an angle, as shown. Such skewing of the teeth and slots reduces internal slot cogging as is generally known. In the preferred embodiment, the yoke 42a is made up of several laminations 109 of soft magnetic material. Although not shown in FIGS. 10–12, it will be appreciated that coil windings 70 (FIG. 8) are provided around the teeth 105 and within the slots 107 as is conventional.

The armature yoke 42a differs from conventional yokes by virtue of it including one or more partial teeth 110. The partial teeth 110 are also made up of laminations 109. More notably, the spacing, width and geometry of the partial teeth 110 are designed so that the portion of the armature yoke 42a with the additional one or more partial teeth 110 has an end effect cogging force that is approximately 180 degrees out of phase from the end effect cogging of the armature yoke 42a without the partial teeth 110. The result is the end effect cogging force of the portion of the armature yoke 42a with the additional one or more partial teeth 110 cancels the end effect cogging force of such an armature yoke 42a without the additional partial teeth 110.

Analysis of the end effect cogging of the armature yoke 42a with the additional partial teeth 110 and without can be done empirically or via modeling, for example. More particularly, the armature yoke 42a may be modeled using commercially available finite element analysis software to determine the end effect cogging both with additional partial teeth 110 and without. By selecting a spacing, width and geometry of the partial teeth 110 so that the end effect cogging force is approximately 180 degrees out of phase with that of the armature 42a without the partial teeth, the end effect cogging forces approximately cancel out.

If the amplitudes of the end effect cogging forces were equal on a per unit basis, the armature yoke 42a would be assembled with 50% having the additional tooth or teeth 110, and 50% not having the additional tooth or teeth 110. This would result in cancellation of the end effect cogging force. Typically, the end effect cogging has different amplitudes on a per unit basis. Therefore, the armature yoke 42a is assembled with a proportion of parts with and without the additional teeth 110 that results in cancellation of the end effect cogging. For example, if the per unit end effect cogging of the armature yoke 42a portion with the additional teeth 110 is two times the per unit end effect cogging of the armature yoke 42a portion without the additional teeth 110, the armature yoke 42a would be assembled with 33.33% of an additional tooth 105 forming the partial tooth 110. Likewise, 67.67% of an additional tooth 105 would be absent. This would result in the net cancellation of the end effect cogging. Because of the skewed slot 107 arrangement in FIGS. 10–12, for example, the 33.33% of an additional tooth 105 can be split into multiple partial teeth 110. An exemplary spacing may be A, 2A and A between the edge of the armature yoke 42a and the partial teeth 110 as shown in FIG. 10. However, other spacings may also provide the desired result.

Moreover, it is noted that such technique for reducing end effect cogging requires the modification of only one end of the armature yoke 42a. There are no partial teeth 110 on the other end of the armature yoke 42a. The cogging reduction is obtained by the addition of all the end effect cogging forces (both portions from both ends of the armature yoke 42a), which effectively negate each other in a significantly reduced cogging force.

Figure 13:
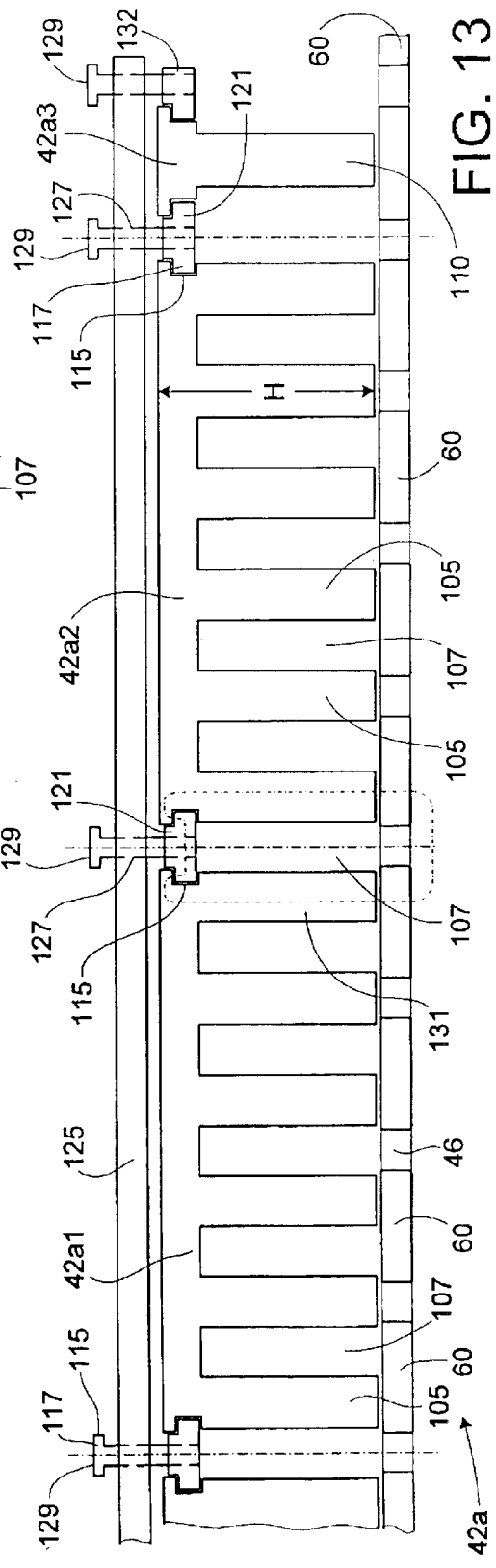
FIG. 13 is a schematic side view of an armature yoke with discrete segments for a linear motor in accordance with the present invention.

Referring to FIG. 13, an exemplary armature yoke 42a is shown in relation to the magnet rail 46 in accordance with another aspect of the present invention. The armature yoke 42a in this embodiment is designed to provide ease and flexibility in manufacturing. The armature yoke 42a in this embodiment is made up of a plurality of discrete segments fastened together end to end. By using a plurality of discrete segments, the armature yoke 42a can easily be manufactured to a desired length without requiring the machining of a single length yoke. For example, a 36-inch long armature yoke may be made from six 6-inch segments connected end-to-end. A 48-inch long armature may be made from eight 6-inch segments connected end-to-end. Thus, a manufacturer or supplier can provide multiple lengths of yokes by combining different numbers of the same length segments, for example. This reduces the need for stocking or supplying many different sizes or lengths of yokes, thus reducing development costs, inventory costs, etc.

As is shown in FIG. 13, the armature yoke 42a may be made up of a plurality of discrete segments (e.g., 42a1, 42a2, etc.) arranged end-to-end. The discrete segments may be the same or different lengths. The particular number of discrete segments will depend on the desired length of the overall yoke 42a and the length of the respective segments as will be appreciated. The yoke 42a makes up one of the armature yokes 42a, 42b in the double-sided linear motor 40 of FIGS. 4–9. The remaining armature yoke 42b is generally a mirror image. However, it will again be appreciated that the armature yoke 42a with discrete segments has equal utility in an otherwise conventional one-sided linear motor. The present invention contemplates all such arrangements.

Each of the discrete yoke segments (e.g., 42a1, 42a2) includes a plurality of teeth 105 with slots 107 therebetween. The ends of the segments 42a1, 42a2 each include a slot 115 into which a respective arm 117 of an upside down T-shaped fastener 121 is inserted. The width of the T-shaped fasteners 121 is selected so as to allow a spacing equal to that of a slot 107 between the teeth 105 of adjacent segments.

A backplate 125 is provided on a backside of the yoke 42a. The backplate 125 includes bore holes 127 through which bolts 129 are inserted. The bolts 129 include threads (not shown) at their ends which engage a threaded hole in the respective T-shaped fasteners 121. By tightening the bolts 129, the respective T-shaped fasteners 121 are drawn upward towards the backplate 125 thereby tightly securing together the respective ends of the yoke segments 42a1, 42a2, etc. Similarly, partial teeth 110 can be joined to what otherwise is one of the ends of the yoke 42a by virtue of an additional segment 42a3 as is shown in FIG. 13. End fasteners 132 may be provided to secure the ends of the yoke 42a.

Moreover, the T-shaped fasteners 121 may be made of a soft magnetic material. The T-shaped fasteners 121 in the preferred embodiment are made of a soft magnetic material and are located in the back iron portion of the yoke segments within the flux path 131 that is created in the yoke. In this manner, the fasteners 121 do not add considerably to the size or weight of the armature yoke 42a. Accordingly, the combination of yoke segments and fasteners 121 provides both manufacturing flexibility and ease.

In a preferred embodiment, the T-shaped fasteners 121 are spaced apart from one another in increments of an integer number of North-South magnetic pole cycles. Such integer number of North-South cycles spacing is desirable as it reduces potential losses due to eddy currents which may otherwise be created without such integer spacing.

Although a T-shaped fastener 121 is used in the exemplary embodiment, it will be appreciated that various other types of fasteners may also be used. The present invention contemplates any other such fasteners.

Figure 14:
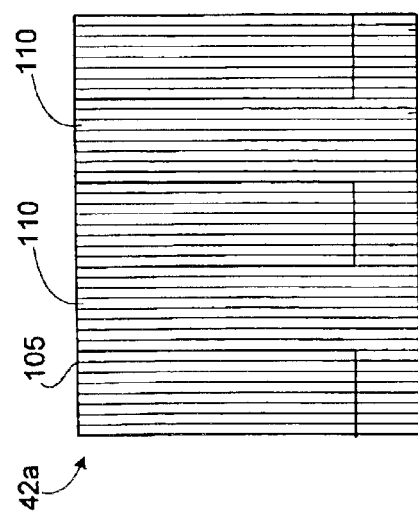
FIG. 14 is a schematic bottom view of an armature yoke with discrete segments for a linear motor in accordance with another embodiment of the present invention.

Referring briefly to FIG. 14, another embodiment of the armature yoke of FIG. 13 is shown. FIG. 14 represents a bottom view of the armature yoke with the windings 70 schematically shown in place wound around the teeth 105 and within the slots 107. In this embodiment, a thin continuous support strip 135 is included along each side of the discrete elements (e.g., 42a1, 42a2, etc). The support strips 135 reduce bowing which otherwise may occur along the length of the discrete elements arranged end-to-end.

More specifically, the discrete elements typically may be arranged end-to-end with T-shaped fasteners 121 therebetween to a desired length. Coils 70 are then wound about the respective teeth 105 within the slots 107. The discrete elements/T-shaped fasteners/windings assembly is then set within a mold and filled, or otherwise secured in epoxy or the like so as to secure the position of the windings. In the embodiment of FIG. 13, the laminated assembly may then be secured to the backplate 125 via the bolts 129, for example.

However, applicants have discovered that the heating and cooling associated with such lamination and the different coefficients of thermal expansion associated with metal and epoxy can lead to bending of the overall combined discrete segments. Specifically, the discrete elements (e.g., 42a1, 42a2, etc.) combined end-to-end will tend to bow either into or out of the plane of the page relative to FIG. 13, for example.

Accordingly, the embodiment of FIG. 14 further includes the support strips 135 made of a continuous thin strip of metal or the like. Although thin and of relatively light weight, the width of the strips 135 can be approximately equal to the height H of the armature (as represented in FIG. 13). The support strips 135 are combined with the aforementioned discrete elements/T-shaped fasteners/windings assembly (e.g., by being abutted along respective sides of the assembly in contact with the outer edges of the windings 70) and secured together in epoxy or the like. In such case, the width of the strip 135 provides significant structural rigidity to the assembly which greatly reduces and/or eliminates bowing. At the same time, the thinness and relative light weight of the strips 135 adds little cost to the armature insofar as overall mass, etc. The combined assembly, following lamination, is then secured to the backplate 125 via the bolts 129, for example.

The support strips 135 have been described herein as having utility for preventing bowing which may occur as a result of discrete elements combined end-to-end. However, it will be appreciated that such support strips 135 are useful even with a single element armature yoke which may otherwise be prone to bowing due to long length, etc. Moreover, although two support strips 135 (one on each side), another embodiment may include only a single support strip 135 on one side. Such embodiments are within the intended scope of the invention.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A linear motor armature, comprising:
   an armature yoke including N teeth separated by slots, where N is an integer, and coil windings within the slots which are energized during operation of the motor; and
   wherein the armature yoke further comprises at least one partial tooth at one end of the armature yoke for reducing an end effect cogging of the linear motor armature in relation to a magnet rail along which the armature will run, and does not include any partial teeth at the other end of the armature yoke.

2. The linear motor armature of claim 1, wherein the armature yoke including the at least one partial tooth is made of a soft magnetic material.

3. The linear motor armature of claim 1, wherein an end effect cogging force of the at least one partial tooth is approximately 180 degrees out of phase from an end effect cogging force of the armature yoke without the at least one partial tooth.

4. The linear motor armature of claim 1, wherein the teeth and slots are skewed to reduce slot cogging.

5. The linear motor armature of claim 1, wherein the armature yoke comprises a plurality of partial teeth at the one end.

6. The linear motor armature of claim 5, wherein the plurality of partial teeth are spaced apart from one another.

7. A linear motor armature yoke, comprising;
   a relatively long yoke having a front face comprising a plurality of slots for receiving armature windings, a rear face and two side faces; and
   at least one thin support strip secured to one of the side faces to reduce bowing along the length of the yoke.

* * * * *